(12) United States Patent  
Kim

(10) Patent No.: US 7,242,431 B2  
(45) Date of Patent: Jul. 10, 2007

(54) VIEWFINDER OF PHOTOGRAPHING APPARATUS AND CAMCORDER HAVING THE SAME

(75) Inventor: Jeong-goo Kim, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 889 days.

(21) Appl. No.: 10/101,357

(22) Filed: Mar. 20, 2002

(65) Prior Publication Data  
US 2002/0171748 A1 Nov. 21, 2002

(30) Foreign Application Priority Data  
May 21, 2001 (KR) .............................. 2001-27554

(51) Int. Cl.  
H04N 5/222 (2006.01)  
H04N 5/225 (2006.01)  
G03B 13/02 (2006.01)

(52) U.S. Cl. ................. 348/333.06; 348/341; 348/374; 396/374

(58) Field of Classification Search .......... 348/333.01, 348/333.06, 333.07, 333.08, 341, 373, 374, 348/375, 376; D16/218, 220; 396/373, 396/374, 383  
See application file for complete search history.

(56) References Cited

U.S. PATENT DOCUMENTS 4,032,940 A * 6/1977 Chan .......................... 396/348  
5,701,535 A * 12/1997 Reibl .......................... 396/373  
5,960,156 A * 9/1999 Nishiyama et al. .......... 386/118  
6,034,728 A * 3/2000 Arena ......................... 348/372  
6,549,237 B1 * 4/2003 Inuma et al. ............. 348/333.06  
6,597,400 B2 * 7/2003 Nishimura .............. 348/333.02  
2001/0005454 A1 * 6/2001 Nishino et al. ............ 396/287  
2001/0036266 A1 * 11/2001 Gronroos et al. ........ 379/433.01  
2002/0196358 A1 * 12/2002 Kim ..................... 348/333.06  
2005/0190278 A1 * 9/2005 Oh ....................... 348/333.01

FOREIGN PATENT DOCUMENTS

| DE | 2362429 A | * | 6/1975 |
| JP | 01283530 A | * | 11/1989 |
| JP | 01298877 A | * | 12/1989 |
| JP | 05110911 A | * | 4/1993 |
| JP | 06102562 A | * | 4/1994 |
| JP | 10191111 A | * | 7/1998 |
| JP | 11234546 A | * | 8/1999 |
| JP | 2001028700 A | * | 1/2001 |

* cited by examiner

Primary Examiner—John M. Villecco  
(74) Attorney, Agent, or Firm—Staas & Halsey LLP

(57) ABSTRACT

A viewfinder to be used with a photographing apparatus or a camcorder to monitor an image being photographed. The viewfinder has a viewfinder body disposed to be drawn inside of the photographing apparatus body and to be drawn out of the photographing apparatus body, a compressing spring to press the viewfinder body to draw the viewfinder body outside of the photographing apparatus body, a locking unit to secure the viewfinder body within the photographing apparatus body, and an unlocking member to unlock the locking unit. Therefore, if the locking unit is unlocked, the viewfinder body is drawn out from a camcorder body by a restoration force of the compressing spring. On the other hand, when a user presses the viewfinder body against the photographing apparatus body, the viewfinder body is drawn into the photographing apparatus body. Thus, the appearance of the photographing apparatus is more appealing to the eye, and storage and handling of the photographing apparatus is easier.

15 Claims, 4 Drawing Sheets

VIEWFINDER OF PHOTOGRAPHING APPARATUS AND CAMCORDER HAVING THE SAME

CROSS-REFERENCE TO RELATED APPLICATIONS

This application claims the benefit of Korean Patent Application No. 2001-27554 filed on May 21, 2001, in the Korean Industrial Property Office, the disclosure of which is incorporated herein by reference.

BACKGROUND OF THE INVENTION

1. Field of the Invention

The present invention relates to a viewfinder of a photographing apparatus, and more particularly to a viewfinder of a photographing apparatus that allows a user to monitor a photographing image or a reproducing image when photographing an object or reproducing the photographed image using a photographing apparatus.

2. Description of the Related Art

A photographing apparatus is a device to photograph an object. As the example of the photographing apparatus, there is an apparatus that can only take photographs, like a manual or an automatic camera, and an apparatus that can record and reproduce images such as a camcorder or a digital camera.

A camcorder (also called a video camera) photographs the object and records it as image data on a videotape, and it is used generally to record and/or reproduce the image. Generally, the camcorder includes a viewfinder to monitor the status of the recording image or the reproducing image, when a user records an image or reproduces the image.

FIG. 1 is a perspective view schematically illustrating a viewfinder of a conventional camcorder.

As shown in FIG. 1, a conventional camcorder 10 includes a camcorder body 11 having a photographing unit (not shown) to photograph an image and a reproducing unit (not shown) to reproduce the photographed image, and a view finder 12 formed on an outer part of the camcorder body 11 to allow the user to monitor the photographing or the reproducing image. The viewfinder 12 can be separated from the camcorder body 11, and is protruded from the camcorder body 11. In addition, the viewfinder 12 can be manually rotated 70°~90° to an upper part of the camcorder body 11 as indicated by the arrow A in FIG. 1.

However, since the viewfinder of the conventional camcorder with the above construction is mounted on the camcorder body as being protruded, there is a problem that the handling and the storing of the product are inconvenient. In addition, when the camcorder is designed, it is difficult to design the appearance of the camcorder as simple and appealing, because the construction of the viewfinder should be considered.

SUMMARY OF THE INVENTION

The present invention has been made to overcome the above and other problems of the related art.

Accordingly, it is an object of the present invention to provide a viewfinder of a photographing apparatus that is easy to handle and store, and a camcorder having the same.

It is another object of the present invention to provide a viewfinder of a photographing apparatus having a design that is simple and appealing to the eye, and a camcorder having the same.

Additional objects and advantages of the invention will be set forth in part in the description which follows and, in part, will be obvious from the description, or may be learned by practice of the invention.

The foregoing and other objects of the present invention are achieved by providing a viewfinder of a photographing apparatus comprising a viewfinder body disposed to be drawn into a photographing apparatus body and to be drawn outside of the photographing apparatus body, a compressing spring to draw the viewfinder body outside of the photographing apparatus body, a locking unit to contain the viewfinder body within the photographing apparatus body, and an unlocking member to unlock the locking unit.

According to the present invention, the viewfinder body is drawn out of the photographing apparatus body by an unlocking action of the locking unit, thus providing a photographing apparatus that is easy to handle and store.

The foregoing and other objects of the present invention may also be achieved by providing a viewfinder of a photographing apparatus comprising a viewfinder body disposed to be drawn within a photographing apparatus body and to be drawn outside of (in an extending fashion) the photographing apparatus body, a compressing spring to compress within and to draw out (extend) the viewfinder body with respect to the photographing apparatus body, a locking unit to lock the viewfinder body within the photographing apparatus body, an unlocking member to unlock the locking unit, a damper to reduce the drawing out speed of the viewfinder body with respect to the photographing apparatus body by a restoration force of the compressing spring, and a guide formed at the photographing apparatus body to guide the drawing in and out of the viewfinder body.

The foregoing and other objects of the present invention may also be achieved by providing a camcorder comprising a camcorder body, a viewfinder body disposed to be drawn into the camcorder body and to be drawn out of the camcorder body, a compressing spring to force the viewfinder body outside of the camcorder body, a locking unit to lock the viewfinder body within the camcorder body, and an unlocking member to unlock the locking unit.

The foregoing and other objects of the present invention may also be achieved by providing a camcorder comprising a camcorder body, a viewfinder body disposed to be drawn within the camcorder body and to be drawn outside of (in an extending fashion) the camcorder body, a compressing spring to force the viewfinder body outside of the camcorder body, a locking unit to lock the viewfinder body within the camcorder body, an unlocking member to unlock the locking unit, a damper to reduce the drawing out speed of the viewfinder body with respect to the camcorder body by a restoration force of the compressing spring, and a guide formed at the camcorder body to guide the drawing in and out of the viewfinder body with respect thereto.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
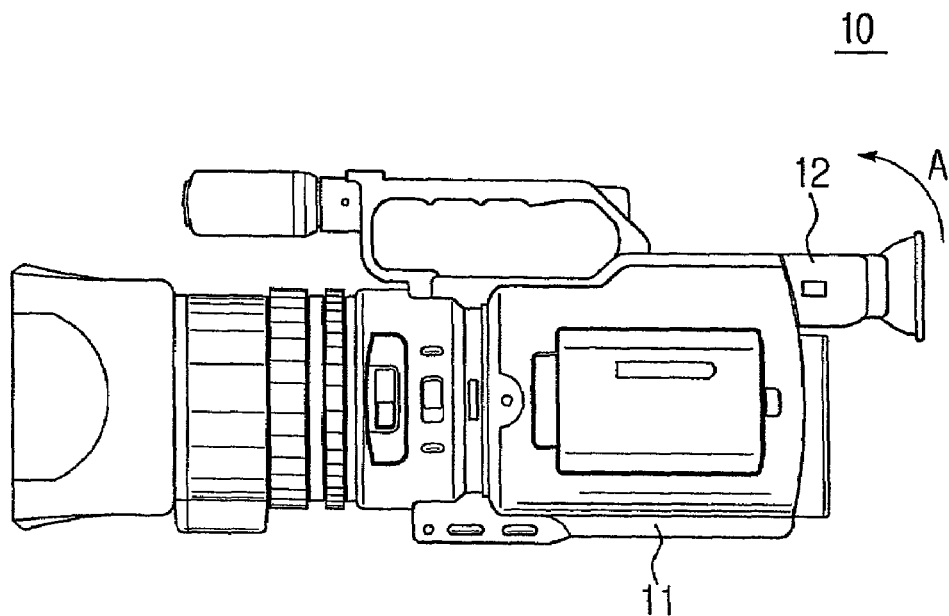
FIG. 1 is a perspective view schematically illustrating a viewfinder of a conventional camcorder.

Reference will now be made in detail to the embodiments of the present invention, examples of which are illustrated in the accompanying drawings, wherein like reference numerals refer to the like elements throughout. The embodiments are described below in order to explain the present invention by referring to the figures.

A camcorder 100 having a viewfinder 120 of a photographing apparatus according to an embodiment of the present invention will be described by referring to FIGS. 2 through 4B.

The camcorder 100 includes a camcorder body 110 and the viewfinder 120. The camcorder body 110 is a casing that includes therein a photographing unit (not shown) to photograph an object or image and a recording unit (not shown) to record the photographed object or image onto a magnetic recording medium.

Figure 2:
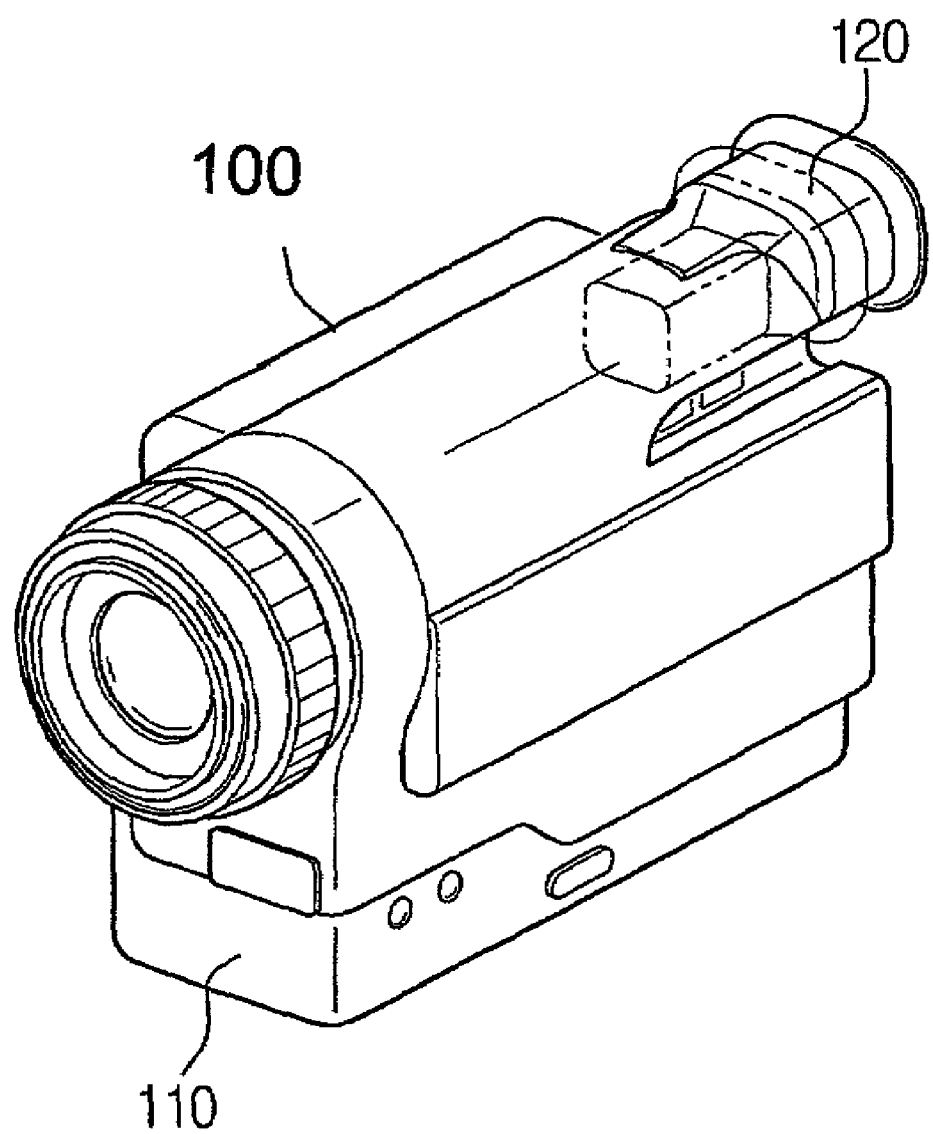
FIG. 2 is a perspective view illustrating a camcorder having a viewfinder according to an embodiment of the present invention.

As shown in FIG. 2, a viewfinder 120 is disposed to be drawn into and out of the camcorder body 110. In FIG. 2, the part indicated by the dotted line illustrates the status of the viewfinder 120 being drawn into the camcorder body 110. In addition, in FIG. 2, the part indicated by the solid line illustrates the status of the viewfinder 120 fully extended out of the camcorder body 110.

Figure 3:
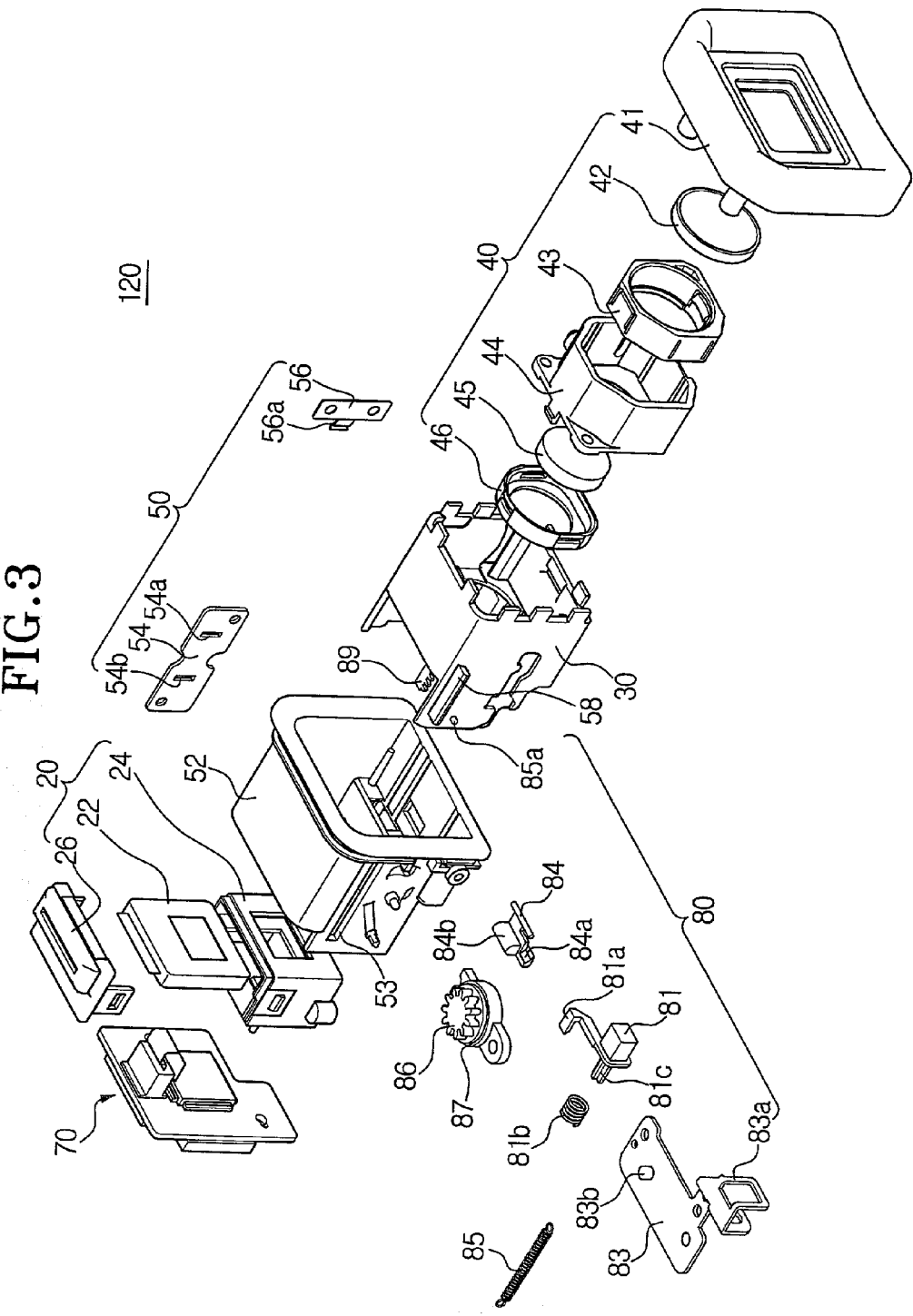
FIG. 3 is an exploded perspective view illustrating the structure of the viewfinder shown in FIG. 2.

The viewfinder 120, as shown in FIG. 3, includes a LCD unit 20, a viewfinder body 30, a lens assembly 40, a guide 50, a controlling unit 70, and a driving unit 80.

The LCD unit 20 to display an image that is to be photographed or reproduced includes a viewfinder LCD 22, a LCD holder 24, and a LCD cap 26. The viewfinder LCD 22 to display the image of an object is inserted into the LCD holder 24 and is secured at the LCD holder 24 by the LCD cap 26.

The lens assembly 40 includes an eyepiece 41, a visibility-adjusting lens 42, a first lens holder 43, an eyepiece holder 44, a magnification lens 45, and a second lens holder 46. The visibility-adjusting lens 42 is disposed at the first lens holder 43, and adjusts a focal point of a user to thereby allow the user to see the image formed on the viewfinder LCD 22 more clearly. The first lens holder 43 is disposed at the eyepiece holder 44 and is secured at the eyepiece holder 44 by the eyepiece 41. The magnification lens 45 is mounted on the second lens holder 46 and adjusts a ratio between the size of the object and the size of the image formed on the viewfinder LCD 22.

The viewfinder body 30 has a cylindrical shape and the lens assembly 40 is formed therein.

The guide 50 includes a guide housing 52, a guide groove 53, a guide plate 54, a plate spring 56, and a restricting protrusion 58. The guide housing 52 is formed at an outer side of the viewfinder body 30 to correspond to the viewfinder body 30, which has a cylindrical shape. The guide housing 52 is disposed at the camcorder body 110 and connected with the viewfinder body 30 to guide the sliding of the viewfinder body 30. As shown in FIG. 4B, the guide plate 54 is secured at an inner side of the guide housing 52. A first guide hole 54a and a second guide hole 54b are formed at the guide plate 54. The first guide hole 54a and the second guide hole 54b are separated from each other by a distance in which the viewfinder body 30 is permitted to be moved. The plate spring 56 is disposed at an outer wall of the viewfinder body 30 to correspond to the location of the guide plate 54. The plate spring 56 includes a guide protrusion 56a that connects with the first and the second guide holes 54a and 54b. The guide housing 52 comprises a guide groove 53 formed therein at an opposite side of which the guide plate 54 is formed. A restricting protrusion 58 is formed at an outer wall of the viewfinder body 30 opposite to the side at which the plate spring 56 is disposed and has a predetermined length. When the viewfinder body 30 is drawn out of the camcorder body 110 in an extending fashion, the restricting protrusion 58 restricts the drawing-out distance of the viewfinder body 30 together with the restriction provided by the guide plate 54 and the plate spring 56 combination.

When the viewfinder body 30 is drawn into the camcorder body 110, the guide protrusion 56a restricts the drawing-in distance of the viewfinder body 30 as the guide protrusion 56a connects with the second guide hole 54b by sliding from the first guide hole 54a to the second guide hole 54b. On the other hand, when the viewfinder body 30 is drawn out of the camcorder body 110, the guide protrusion 56a restricts the drawing-out distance of the viewfinder body 30 as the guide protrusion 54a connects with the first guide hole 54a by sliding from the second guide hole 54b to the first guide hole 54a. The restricting protrusion 58 also restricts the drawing-out distance of the viewfinder body 30 with the aid of a stopping unit (not shown) formed at the end of the drawing-out direction of the viewfinder body 30 and inside the corresponding guide housing 52. The viewfinder body 30 has a locking hole 58a and a drawing-out hole 58b at a lower side thereof, as illustrated in FIG. 4B.

The controlling unit 70 to control the LCD unit 20 is formed at the camcorder body 110.

Referring to FIG. 3, the driving unit 80 includes a drawing-out button 81, a damper bracket 83, a locking unit 84, a compressing spring 85, a pinion 86, a damper 87, and a gear rack 89. The damper bracket 83 is disposed at the camcorder body 110. The damper bracket 83 includes a drawing-out holder 83a to install the drawing-out button 81, and a damper protrusion 83b to install the damper 87. The drawing-out button 81 includes a pressing unit 81a, a spring 81b, and a button shaft 81c. The spring 81b is disposed at the drawing-out button holder 83a and connected with the button shaft 81c of the drawing-out button 81. The pressing unit 81a forms an obtuse angle against the pressing direction of the drawing-out button 81. In an embodiment of the present invention, the drawing-out button 81 is used as an unlocking member, but the present invention is not limited thereto. For example, in place of the drawing-out button 81, a sliding button can be used.

The locking unit 84 includes a lever 84a and a hook 84b. The lever 84a is formed to correspond to the pressing unit 81a and is operated in contact with the pressing unit 81a. The compressing spring 85 is disposed at the guide groove 53 in a manner that one end is connected with the first protrusion 85a formed at a predetermined place of the viewfinder body 30, and the other end is connected with a second protrusion 85b formed at the housing 52. The damper 87 is disposed at the damper bracket 83, and the pinion 86 is connected with the damper 87. The pinion 86 includes gears on its outer circumference and is engaged with the gear rack 89 formed at a lower side of the viewfinder body 30.

Figure 4A:
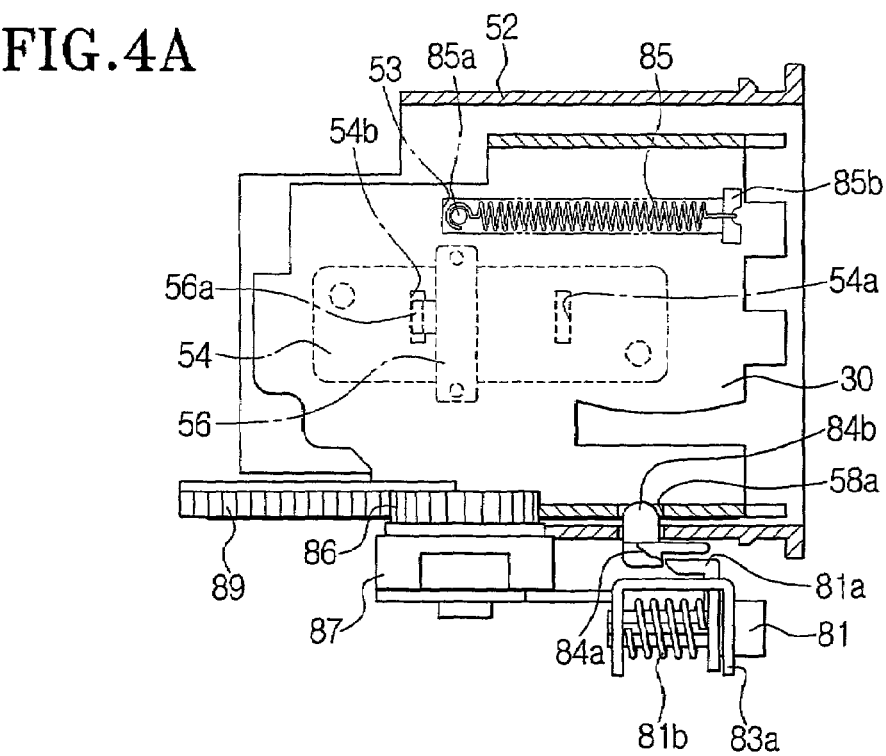
FIG. 4A is a side view illustrating the viewfinder of FIG. 3 being drawn in to a camcorder body.
Figure 4B:
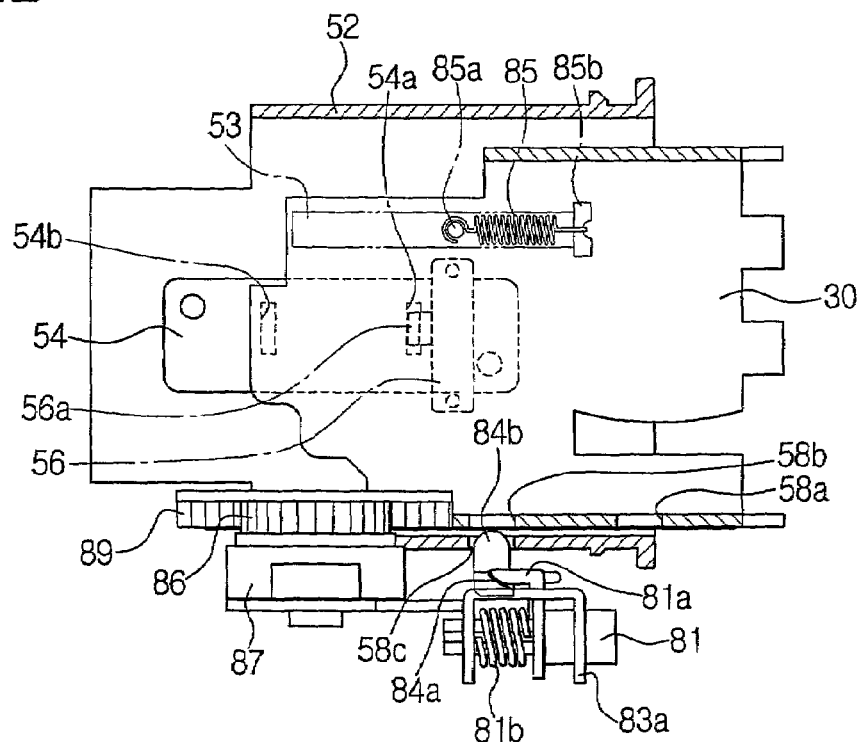
FIG. 4B is a side view illustrating the viewfinder of FIG. 3 being drawn out from the camcorder body.

Referring to FIGS. 4A and 4B, drawing-in and drawing-out action of the viewfinder 120 of a photographing apparatus according to the present invention will be described.

As shown in FIG. 4A, the viewfinder body 30 is connected with the housing 52. The hook 84b of the locking unit 84 is engaged with the locking hole 58a of the lower side of the viewfinder body 30 and the locking groove 58c (FIG. 4B) of a lower side of the housing 52, and connects the viewfinder body 30 and the housing 52. At this time, the compressing spring 85 is extended, and the guide protrusion 56a of the plate spring 56 is connected with the second connection protrusion 54b.

When the user wants to draw the viewfinder 120 out of the camcorder body 110 in an extending fashion, the user presses the drawing-out button 81. When the drawing-out button 81 is pressed, the pressing unit 81a contacts with a sloping side of the lever 84a, and then the hook 84b is moved downward. Accordingly, the hook 84b is separated from the locking hole 58a of the viewfinder body 30. If the hook 84b is separated from the locking hole 58a, the viewfinder body 30 is extended from the camcorder body 110 by a restoration force of the compressing spring 85 that has been extended. When the compressing spring 85 returns to its unextended position, the rack 89, formed at a lower side of the viewfinder body 30, is moved toward the drawing-out direction of the viewfinder 120 while being engaged with the pinion 86. The rotation of the pinion 86 is maintained at a constant speed by the damper 87 in spite of the restoration force of the compressing spring 85. The damper 87 has an effect of softening the drawing-in and drawing-out action of the viewfinder 120. The drawing-out action of the viewfinder body 30 is stopped when the guide protrusion 56a of the plate spring 56 connects with the first guide hole 54a of the guide plate 54. Further, the hook 84b engages with the drawing-out hole 58b to further support the viewfinder body in its extended position with respect to camcorder body 110. The viewfinder body 30 to be drawn out from the housing 52 is illustrated in FIG. 4B.

On the other hand, when the user wants to draw the viewfinder body 30 back into the camcorder body 110, the user pushes the viewfinder body 30 in the direction of the camcorder body 110 until the hook 84b of the locking unit 84 is connected with the connection hole 58c of the housing 52 and the locking hole 58a of the viewfinder body 30.

According to the present invention, the viewfinder 120 is drawn out of the camcorder body 110 as the viewfinder body 30 is extended from the housing 52 by pressing the drawing-out button 81. On the other hand, the handling and the keeping of the camcorder is easy and the appearance of the camcorder can be designed easier and more appealing to the eye by the viewfinder body 30 being drawn into the camcorder body 110.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A viewfinder for use in a photographing apparatus, comprising;
   an in-line viewfinder body disposed to be drawn substantially within a photographing apparatus body and to be drawn substantially out of the photographing apparatus body, for in-line direct viewing by a user;
   a compressing spring to press said viewfinder body to be drawn substantially outside of the photographing apparatus body;
   a locking unit to lock said viewfinder body within the photographing apparatus body; and
   an unlocking member to unlock said locking unit; and
   a guide including a guide housing formed at an outer side of the viewfinder body into which the viewfinder body is drawn, a guide plate secured at an inner side of the guide housing and a plate spring connecting with the guide plate, the guide guideing a sliding of the viewfinder body and the guide plate and plate spring restricting at least one of a drawing-out distance and a drawing-in distance of the viewfinder body.

2. The viewfinder according to claim 1, further comprising a damper to reduce a drawing out speed of said viewfinder body drawn out by a restoration force of the compressing spring.

3. The viewfinder according to claim 1, wherein said viewfinder body comprises a cylindrical shape, and said guide comprises a cylindrical shape and is movably connected with an external portion of said viewfinder body to slide said viewfinder body using said guide.

4. A camcorder, comprising;
   a camcorder body comprising a recording and reproducing unit to record and reproduce an image;
   an in-line viewfinder body disposed to be drawn substantially within the camcorder body and to be drawn substantially out of said camcorder body, for in-line direct viewing by a user, said viewfinder body comprising a viewfinder to view the image to be recorded and/or reproduced;
   a compressing spring to force said viewfinder body outside of said camcorder body;
   a locking unit to lock said viewfinder body within said camcorder body;
   an unlocking member to unlock said locking unit; and
   a guide including a guide housing formed at an outer side of the viewfinder body into which the viewfinder body is drawn, a guide plate secured at an inner side of the guide housing and a plate spring connecting with the guide plate, the guide guiding a sliding of the viewfinder body and the guide plate and plate spring restricting at least one of a drawing-out distance and a drawing-in distance of the viewfinder body.

5. The camcorder according to claim 4, further comprising a damper to reduce a drawing out speed of said viewfinder body drawn out by a restoration force of said compressing spring.

6. The camcorder according to claim 4, wherein said viewfinder body has a cylindric shape, and said guide has a cylindric shape and is movably connected with an outside of said viewfinder body to allow the viewfinder body to slide using said guide.

7. A viewfinder for use in a photographing apparatus, comprising:
   an in-line viewfinder body disposed to be drawn into a photographing apparatus body and to be drawn out of the photographing apparatus body, for in-line direct viewing by a user;
   a compressing spring to force said viewfinder body substantially outside of the photographing apparatus body;
   a locking unit to lock said viewfinder body within the photographing apparatus body;
   an unlocking member to unlock said locking unit;

a damper to reduce a drawing out speed of the viewfinder body drawn out by a restoration force of the compressing spring; and a guide including a guide housing formed at an outer side of the viewfinder body into which the viewfinder body is drawn, a guide plate secured at an inner side of the guide housing and a plate spring connecting with the guide plate, the guide guiding a sliding of the viewfinder body and the guide plate and plate spring restricting the drawing in and out of the viewfinder body.

8. A camcorder, comprising;

a camcorder body;

an in-line viewfinder body disposed to be drawn into the camcorder body and to be drawn out of the camcorder body, for in-line direct viewing by a user;

a compressing spring to force the viewfinder body outside of the camcorder body;

a locking unit to lock the viewfinder body within the camcorder body;

an unlocking member to unlock the locking unit;

a damper to reduce the drawing out speed of the viewfinder body drawn out by a restoration force of the compressing spring; and a guide including a guide housing formed at an outer side of the viewfinder body into which the viewfinder body is drawn, a guide plate secured at an inner side of the guide housing and a plate spring connecting with the guide plate, the guide guideing a sliding of the viewfinder body and the guide plate and plate spring restricting the drawing in and out of the viewfinder body.

9. A viewfinder for use in a photographing apparatus, comprising:

a viewfinder body disposed to be drawn substantially within a photographing apparatus body and to be drawn substantially out of the photographing apparatus body;

a compressing spring to press said viewfinder body to be drawn substantially outside of the photographing apparatus body;

a locking unit to lock said viewfinder body within the photographing apparatus body; and an unlocking member to unlock said locking unit; and a guide formed at the photographing apparatus body to guide the drawing in and out of said viewfinder body;

wherein the viewfinder body includes a locking hole to engage with said locking unit to maintain said viewfinder body at a first position within said guide and a drawing-out hole to engage with said locking unit to maintain said viewfinder body at a second position outside of said guide.

10. The viewfinder according to claim 9, wherein said guide comprises a locking groove to receive said locking unit such that said locking unit extends through said locking groove and said locking hole to maintain said viewfinder body at the first position within said guide and to receive said locking unit such that said locking unit extends through said locking groove and said drawing-out hole to maintain said viewfinder body at the second position outside of said guide.

11. The viewfinder according to claim 10, wherein said unlocking unit comprises:

a pressing unit;

a drawing-out button to move said locking unit with respect to said locking groove, said locking hole and said drawing-out hole when pressed; and a spring to apply force in a direction opposite to a direction of said drawing out button when pressed.

12. The viewfinder according to claim 11, wherein said locking unit comprises:

a lever; and a hook to extend through said locking groove, said locking hole and said drawing-out hole such that when said drawing-out button is pressed, said pressing unit contacts said lever to move said hook away from said viewfinder body.

13. The viewfinder according to claim 9, wherein said guide comprises:

a guide housing having a guide grove formed therein;

a guide plate having first and second guide holes and connected within said guide housing;

a plate spring having a guide protrusion and connected to said viewfinder body to face said guide plate; and a restricting protrusion slidably movable within said guide groove and connected to said viewfinder body.

14. The viewfinder according to claim 13, wherein said guide protrusion is connected within said first guide hole when said viewfinder is fully drawn out of said guide housing to restrict the drawing in movement of said viewfinder body, and said guide protrusion is connected within said second guide hole when said viewfinder is fully drawn into said guide housing to restrict the drawing out movement of said viewfinder body.

15. The viewfinder according to claim 13, wherein said restricting protrusion contacts a stop unit to restrict the drawing in and drawing out movement of said viewfinder body with respect to said guide housing.

* * * * *

UNITED STATES PATENT AND TRADEMARK OFFICE
CERTIFICATE OF CORRECTION

| | | |
|---|---|---|
| PATENT NO. | : 7,242,431 B2 | |
| APPLICATION NO. | : 10/101357 | |
| DATED | : July 10, 2007 | |
| INVENTOR(S) | : Jeong-goo Kim | |

It is certified that error appears in the above-identified patent and that said Letters Patent is hereby corrected as shown below:

Column 7, Line 28, change "guideing" to --guiding--.

Signed and Sealed this

Fourth Day of December, 2007

JON W. DUDAS
*Director of the United States Patent and Trademark Office*